United States Patent
McCormick

[11] 3,912,306
[45] Oct. 14, 1975

[54] PIPE FLANGE
[75] Inventor: James McCormick, Jackson, Mich.
[73] Assignee: Tenneco Inc., Racine, Wis.
[22] Filed: July 22, 1974
[21] Appl. No.: 490,305

[52] U.S. Cl. .................. 285/12; 285/332; 285/412
[51] Int. Cl.² ............................................ F16L 23/00
[58] Field of Search ............ 285/412, 368, 12, 337,
285/332, 405, 363

[56] References Cited
UNITED STATES PATENTS

| | | | |
|---|---|---|---|
| 969,422 | 9/1910 | Tanner et al. | 285/368 X |
| 1,061,712 | 5/1913 | Whitaker | 285/337 X |
| 1,070,667 | 8/1913 | Clark | 285/337 X |
| 1,955,832 | 4/1934 | Raybould | 285/368 X |
| 3,704,995 | 12/1972 | Hetherington | 285/412 X |
| 3,720,428 | 3/1973 | Zastawny | 285/368 |

Primary Examiner—Thomas F. Callaghan
Attorney, Agent, or Firm—Harness, Dickey & Pierce

[57] ABSTRACT

A pipe to manifold attachment flange has a nut engaging web and a central collar with pipe engaging shoulders thereon located different axial distances from the web so that the flange may be used with different length manifold studs and different size manifold openings.

3 Claims, 4 Drawing Figures

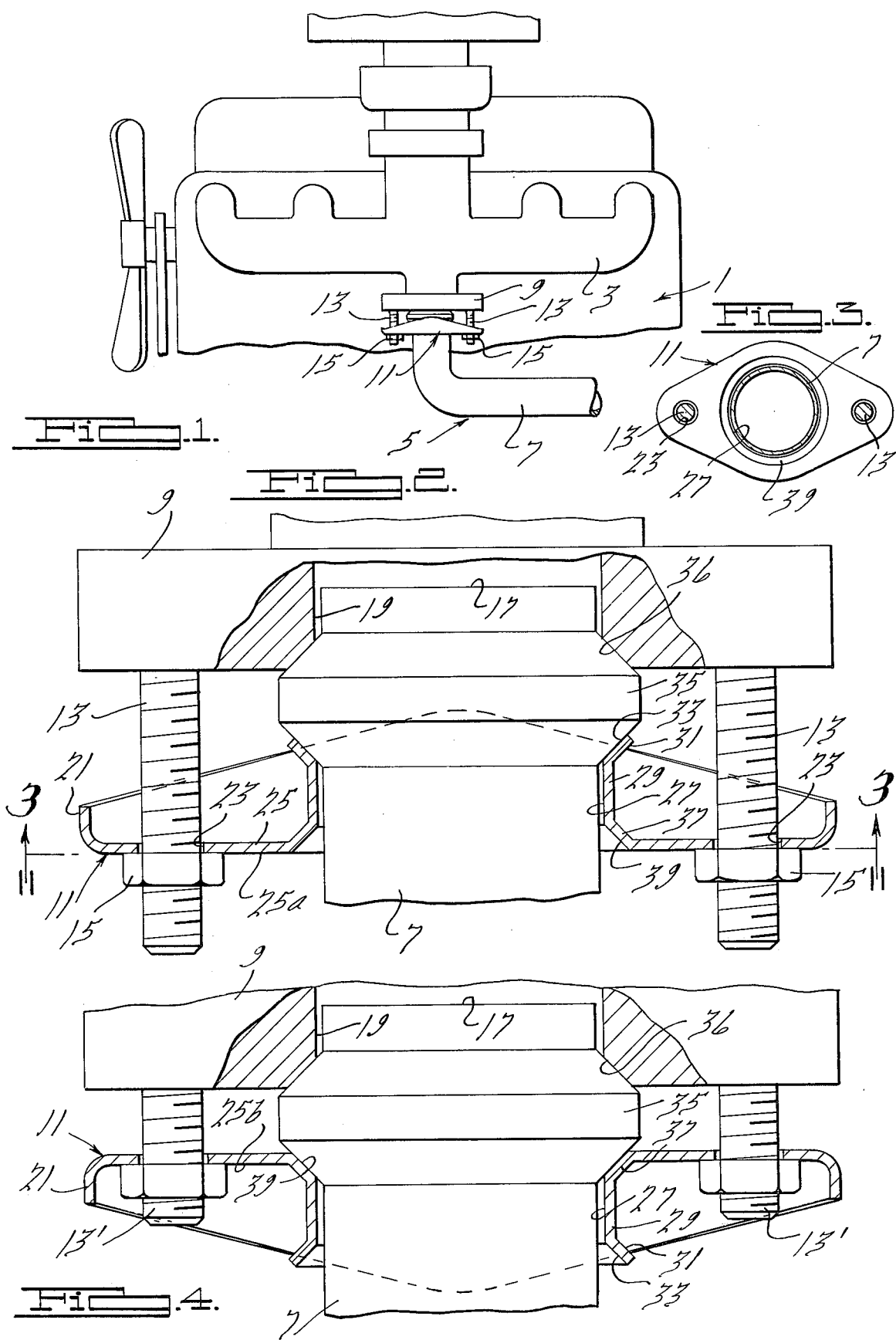

1

PIPE FLANGE

BRIEF SUMMARY OF THE INVENTION

It is the purpose of the invention to provide a pipe to manifold attachment flange for use in attaching exhaust pipes to internal combustion engine exhaust manifolds that may be used with manifolds having different stud lengths and different hole diameters, thereby standardizing the flange construction to some degree.

The invention accomplishes this by means of a pressed sheet metal flange having a central collar extending normally to the plane or web of the flange and constructed to have pipe engaging shoulders at opposite ends.

DESCRIPTION OF THE DRAWINGS

FIG. 1 is a schematic side elevation of an internal combustion engine with an exhaust system, partly broken away, that is secured to the manifold by means of a flange embodying the invention;

FIG. 2 is an enlarged side elevation partly broken away and partly in section of the flange as used with a manifold having long studs;

FIG. 3 is a view along the line 3—3 of FIG. 2; and

FIG. 4 is a view similar to that of FIG. 2 but showing the flange as used with a manifold having short studs.

DESCRIPTION OF THE INVENTION

An internal combustion engine 1 has an exhaust manifold 3 and an exhaust system 5 with an exhaust pipe 7 that is attached to the manifold flange 9 by means of the pipe to manifold attachment flange 11. The manifold flange 9 has two threaded studs 13 that extend through holes in the attachment flange 11 and receive nuts 15. The attachment flange 11 is thereby securely fastened to the manifold flange with the inlet end 17 of pipe 7 in fluid tight communication with the gas flow outlet opening 19 in the manifold.

In the field, the studs 13 may be of different lengths and the openings 19 of different diameters from one engine to another. The attachment flange 11 of this invention is designed so that one specific flange will fit various lengths of studs and various diameters of openings. It is a sheet metal stamping having a conventional shape in plan view as seen in FIG. 3 and a conventional upturned side edge or flange 21 extending around its outer periphery to add strength. Holes 23 are punched in the flat web 25 of the flange to enable it to fit over the studs 13 so that nuts can shoulder against web surface 25a. The central opening 27 in the flange to receive pipe 7 is defined by a collar 29 drawn from web 25 to extend in the same direction as the side flange 21. The collar has an outwardly flared end section 31 to provide a shoulder 33 that engages a flange or enlargement 35 of a suitable kind on the pipe 7, as seen in FIG. 2, that has a gas tight fit against the seat 36 on the manifold housing 9. Further, the collar 29 makes a tapered or conical corner 37 with the web 25 to provide a convex shoulder 39 that also may engage the enlargement 35 on pipe 7 upon reversal of the flange as seen in FIG. 4. In this arrangement it is fastened to the manifold by short studs 13 and nuts 15 bearing against web surface 25b. The conical pipe flange engaging shoulders 33 and 39 are formed on the required angle to seal against the pipe enlargement 35 (45° being shown) and their lengths are sufficient to permit them to engage as wide a range of diameters as desired. The attachment flange is shown as having a loose fit on the conduit 7; however, it can be welded to it in the proper up or down position to suit the installation.

Thus, the invention provides a pipe attachment flange for a fluid flow system in which a pair of pipe engaging surfaces 33 and 39 and a pair of fastener engaging surfaces 25a and 25b have different spacings one from the other to accommodate different length threaded cylindrical fasteners 13 and 13'. Also, the surfaces 33 and 39 have a diameter and radial length sufficient to accommodate a substantial range of pipe sizes.

The principles of the invention are applicable, of course, to modified constructions and the invention may be used with different type pipe flange arrangements than that illustrated by enlargement 35. Modifications in the specific details may be made without departing from the spirit and scope of the invention.

I claim:

1. In a fluid flow system, such as the exhaust system of an internal combustion engine, for attachment to a housing having a fluid passage therein, such as the exhaust manifold of an internal combustion engine, a pipe for connection to the housing to communicate with the passage, said pipe having an annular flange extending radially outwardly at the end of the pipe to be connected to the housing, a pipe attachment flange comprising a substantially sheet-like member having a flat web and having a collar formed therein to project at right angles to the plane of the web, the interior of said collar defining an opening of circular cross section and uniform diameter and said pipe extending through said opening, said collar and said web intersecting in a substantially conical corner at one end of the collar to provide a first substantially conical surface for engagement with said annular flange, the other end of the collar having a substantially conical flange providing a second substantially conical surface adapted to engage said annular flange, said web having openings therein to receive cylindrical fasteners for attaching the flange to said housing, said first and second conical surfaces having substantially the same cone angle and the same diameter at their small ends whereby the flange may be used with either conical surface facing said housing to thereby provide two different spacings of said web from said housing.

2. A pipe to manifold attachment flange for attachment to a face of the manifold comprising a sheet like member having a flat web, a pipe receiving collar formed from the web to extend at right angles thereto and one end of the collar making a corner with the web which is substantially conical on the convex side to form a first annular pipe flange engaging shoulder, the end of the collar remote from the web being flared outwardly to form a second substantially conical and annular pipe flange engaging shoulder, said web having apertures through it on opposite sides of the collar to receive cylindrical fasteners for attaching the flange to said manifold face, said first and second conical surfaces having substantially the same cone angle and the same diameter at their small ends whereby the flange may be used with either conical shoulder facing said manifold face to thereby provide two different spacings of said web from said manifold face.

3. A flange as set forth in claim 2 wherein said corner and said flared end form conical surfaces extending at an angle of substantially 45° to the axis of the collar.

* * * * *